United States Patent [19]

Abe et al.

[11] Patent Number: 4,944,832

[45] Date of Patent: Jul. 31, 1990

[54] LABEL PEELER

[75] Inventors: Ichiro Abe; Toshio Suzuki, both of Tokyo, Japan

[73] Assignee: Kirin Beer Kabushiki Kaisha, Tokyo, Japan

[21] Appl. No.: 301,635

[22] Filed: Jan. 25, 1989

[30] Foreign Application Priority Data

Jan. 27, 1988 [JP] Japan .............................. 63-8111[U]

[51] Int. Cl.[5] .............................................. B32B 31/18

[52] U.S. Cl. ................................ 156/584; 15/236.07; 30/169; 83/924; 156/154; 156/250; 156/344; 156/523; 156/527

[58] Field of Search ........................ 15/236.01, 236.07; 30/169; 83/924; 156/154, 250, 344, 523, 527, 584

[56] References Cited

U.S. PATENT DOCUMENTS

| | | | |
|---|---|---|---|
| 3,983,595 | 10/1976 | Knudsen et al. | 30/169 X |
| 4,013,497 | 3/1977 | Wolf | 156/154 |
| 4,220,481 | 9/1980 | Bleiman et al. | 156/584 X |
| 4,325,775 | 4/1982 | Moeller | 156/584 |
| 4,508,588 | 4/1985 | Parrish | 156/584 |
| 4,599,131 | 7/1986 | Matuszak | 156/154 X |
| 4,715,920 | 12/1987 | Ruppman et al. | 156/344 |

*Primary Examiner*—Robert A. Dawson

*Attorney, Agent, or Firm*—Ladas & Parry

[57] ABSTRACT

A label peeler for peeling off a label attached to a side of a container such as a bottle includes a holder for holding the container, label scraping means for scraping the label off the container by effecting sliding movement in intimate contact with the side of the container, and driving means for varying the relative position of the container and the lavel scraping means to remove the label from the side of the container. With the container being held by the holder, the holder or the label scraping means or both are moved to vary the relative position of the container and the label scraping means while keeping the label scraping means in close contact with the side of the container, for thereby mechanically peeling the label off the container.

5 Claims, 6 Drawing Sheets

LABEL PEELER

BACKGROUND OF THE INVENTION

The present invention relates to a label peeler, and more particularlY to a device for peeling off a label bonded to a container such, for example, as a bottle that has been recovered for reuse.

Containers such as beer bottles are normally recovered for reuse. Any label bonded to a recovered bottle must be peeled off to allow the bottle to be recycled. It has been customary to peel off such a label by placing a bottle in a holder coupled to a chain, immersing the bottle in a high-temperature alkaline solution for a relatively long period of time (about 20 minutes) to permit the glue to be dissolved into the alkaline solution, thereafter stirring the alkaline solution to peel the label off the side of the bottle, and then applying a jet of water from a jet nozzle to clean the outer surface of the bottle.

Japanese Utility Model Laid-Open Publication No. 55-27695 discloses a device for peeling off a label by ejecting water under high pressure. In the disclosed device, a bottle is rotatably supported, and water is ejected under high pressure from a jet nozzle toward the bottle to rotate the bottle with the applied water jet. The label is peeled off by the rotation of the bottle and the action of the water jet, withOut being immersed in any solution.

According to the former process employing the alkaline solution for peeling the label, however, the bottle has to be immersed in the alkaline solution for a long period of time for completely dissolving the applied glue into the solution. In Order that the bottle will be immersed in the alkaline solution for a long period of time, the bottle is moved along a vertically tortuous path in a large-size immersion tank. As a result, the bottle cleaning machine including the immersion tank is highly expensive, and the overall bottle cleaning machine needs a large installation area.

Another problem with the former process is that the chain interconnecting a number of holders for holding respective bottles is long and a large amount of energy is consumed to move the bottles. Since the immersion tank is large in size, a large amount of heat is radiated from the immersion tank, and a large amount of heat energy must be applied to make up for the radiated heat. A special discharging unit is required to discharge deposited peeled labels from the immersion tank. Where a fibrous deposit resulting from peeled labels is accumulated in the immersion tank, the tank must be opened periodically, and the deposit must be discharged manually.

The peeling process disclosed in the above publication for peeling off labels only with a water jet does not suffer the drawbacks the former process has. However, labels can be peeled off less reliably, and the glue cannot fully be removed only by the application of the water jet.

SUMMARY OF THE INVENTION

In view of the aforesaid shortcomings of the conventional label peeling devices for peeling off labels by immersing them in an alkaline solution and by applying a water jet, it is an object of the present invention to provide a device for peeling off a label reliably in a short period of time through a simple process.

To achieve the above object, there is provided in accordance with the present invention a device for peeling off a label attached to a side of a container such as a bottle, the device including a holder for holding the container, label scraping means for scraping the label off the container by effecting sliding movement in intimate contact with the side of the container, and driving means for varying the relative position of the container and the label scraping means to remove the label from the side of the container.

With the container being held by the holder, the holder or the label scraping means or both are moved to vary the relative position of the container and the label scraping means while keeping the label scraping means in close contact with the side of the container, for thereby mechanically peeling the label off the container.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

A label peeling device according to an embodiment of the present invention will hereinafter be described with reference to FIGS. 1 through 6 and 7(*a*) through 7(*c*).

The label peeling device is generally combined with a bottle cleaning machine for simultaneously peeling an attached label off a bottle and cleaning the bottle. However, the label peeling device may be used independently of such a bottle cleaning machine. Therefore, the basic construction of the label peeling device as an independent unit will first be described below.

Figure 1:
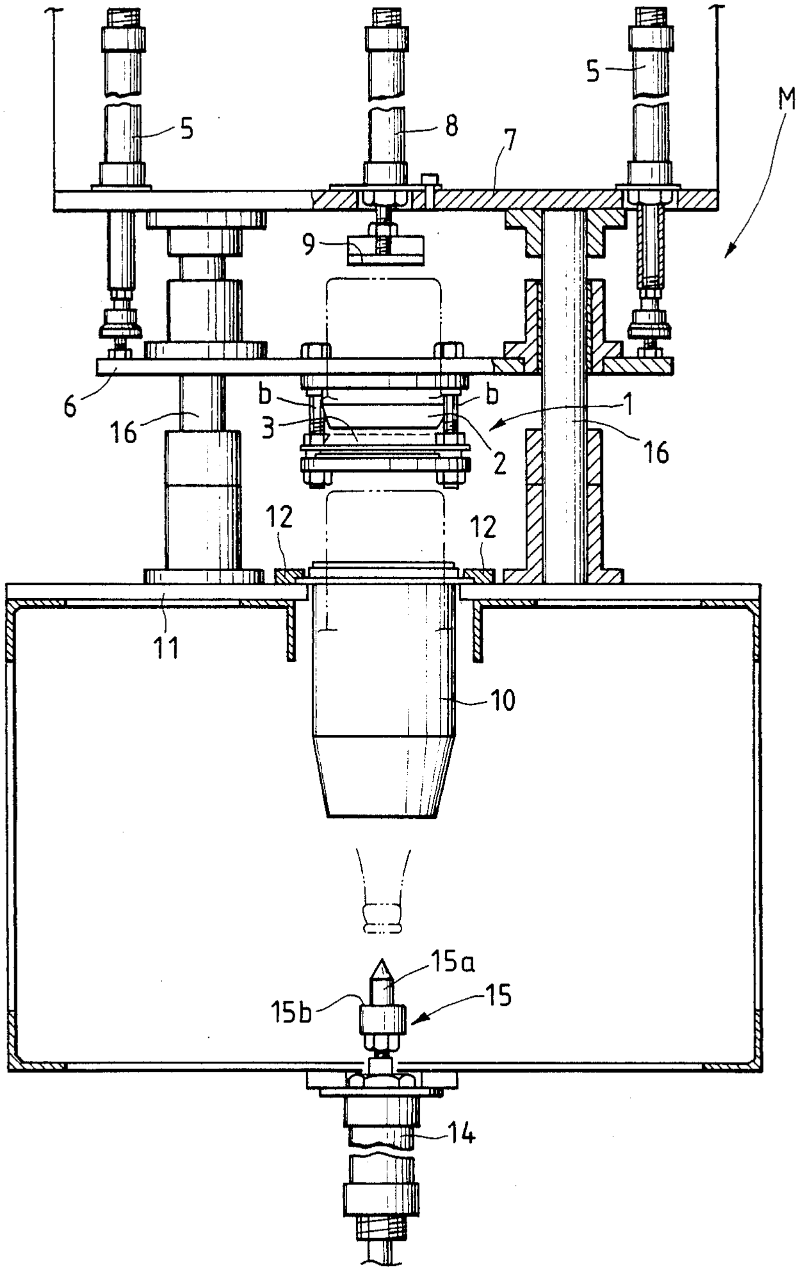
FIG. 1 is an elevational view, partly in cross section, of a label peeling device according to the present invention.
Figure 2:
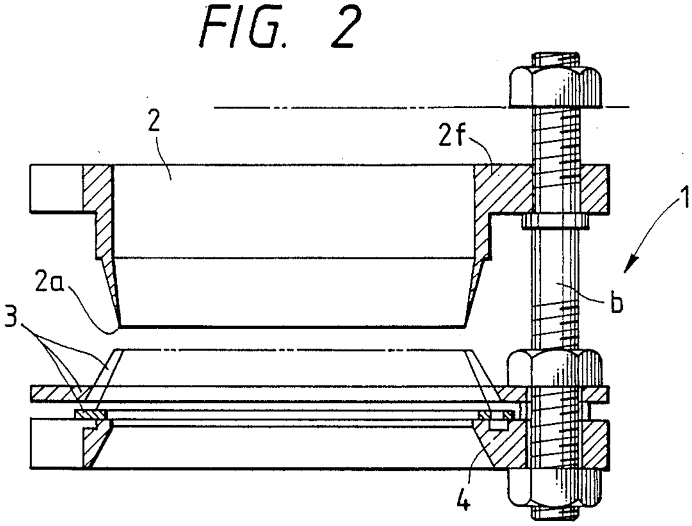
FIG. 2 is an enlarged cross-sectional view of a label scraping unit of the label peeling device shown in FIG. 1.

FIG. 1 shows an overall structure of the label peeling device generally designated by M. The label peeling device M includes a label scraping unit 1 which comprises, as shown in FIG. 2, a label scraper 2, a label reattachment prevention member 3 in the form of a brush disposed in coaxially confronting relationship to the label scraper 2, a bottle guide member 4, and two connecting rods b which connects the bottle guide member 4 and the label reattachment prevention member 3 to the label scraper 2. The label scraper 2 comprises a substantially cylindrical member having a flange 2*f* and a scraper blade 2*a* on its lower end. The scraper blade 2*a* has an inside diameter which is slightly smaller than the outside diameter of a bottle (by about 1.5 mm), so that a label attached to the outer surface of the bottle can be scraped off. The label scraper 2 is made in its entirety of an elastomeric material such as polyethylene or the like. Therefore, the annular scraper blade 2*a* is radially contractable and expandable.

The label reattachment prevention member 3 is not limited to a brush, but may be in the form of a flexible rubber or plastic plate.

As shown in FIG. the label scraping unit 1 is fixedly mounted on an operating plate 6 which is vertically movable by a pair of scraping unit operating cylinders 5. The scraping unit operating cylinders 5 are supported on an upper frame 7 which also supports a pad operating cylinder 8 with a presser pad 9 for engaging and holding the bottom of the bottle being attached to the piston rod of the cylinder 8.

A holder 10 for holding the bottle is disposed below the label scraping unit in axially confronting relationship thereto. The holder 10 has an annular attachment flange sandwiched between a lower frame 11 and a pair of L-shaped members 12, the holder 10 being slidable toward the viewer of FIG. 1.

A bottle lifting cylinder 14 is supported on the lower frame 11 below the holder 10 in coaxial relationship thereto. The bottle lifting cylinder 14 has a piston rod supporting on its distal end a bottle holder member 15 for engaging in the mouth of the bottle to hold the bottle in position. The bottle holder member 15 has a tapered portion 15*a* for being inserted into the bottle mouth and an engaging step surface 15*b* for engaging the end surface of the bottle mounth.

Between the upper and lower frames 7, 11, there extend guide rods 16 for guiding the operating plate 6 thereon.

Operation of the label peeling device thus constructed will be described below with reference to FIGS. 3 through 6 and 7(*a*) through 7(*c*).

Figure 3:
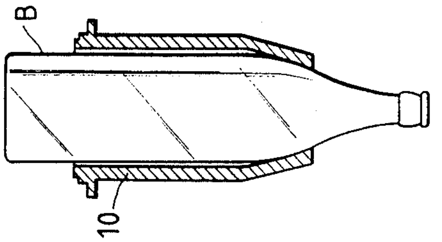

First, the holder 10 is pulled toward the viewer of FIG. I until the upper surface of the holder 10 is displaced sideways fully out of a space below the label scraping unit 1. Then, a bottle B with its mouth directed downwardly is inserted from above into the holder 10, and held upside down in the holder 10 as shown in FIG. 3. The holder 10 with the bottle B held therein is then moved back until the upper surface of the holder 10 confronts the label scraping unit 1.

Figure 4:
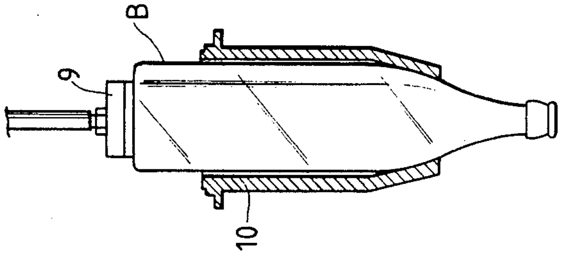
Figures 7A, 7B, 7C:
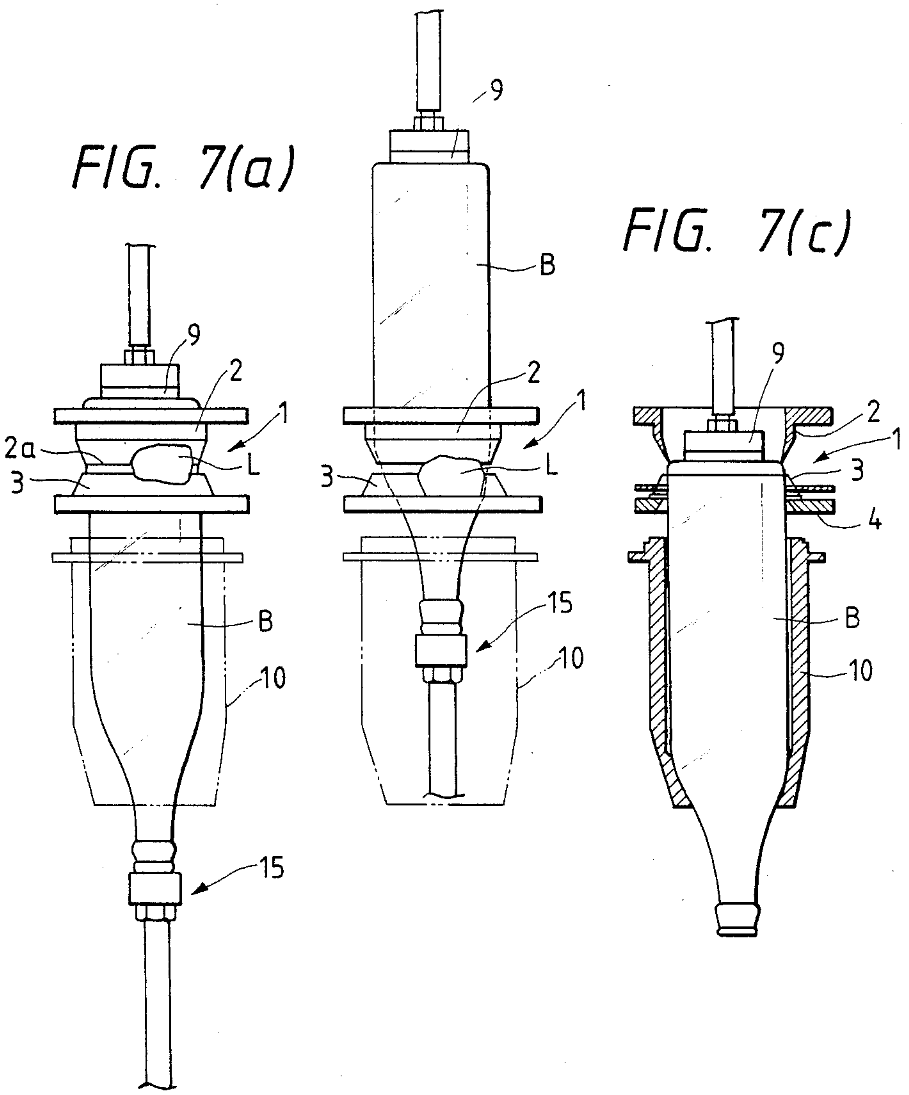

Thereafter, the pad operating cylinder 8 is operated to bring the presser pad 9 into abutment against the bottom of the bottle B as shown in FIG. 4. Then, the supply of a working fluid such as air to the pad operating cylinder 8 is stopped, allowing the presser pad 9 to hold the bottom of the bottle B by gravity and friction. The scraping unit operating cylinders 5 are actuated to lower the operating plate 6 to position the label scraping unit in a low operating position shown in FIG. 5. At this time, the bottom of the bottle B is positionally corrected or adjusted by a tapered guiding surface of the bottom guide member 4 of the label scraping unit 1 to keep the bottle B substantially upright, and the round outer periphery of the bottom of the bottle B is held in close contact with the tip of the scraper blade 2*a* of the label scraper 2. Subsequently, the bottle lifting cylinder 14 is operated to insert the tapered portion 15*a* of the bottle holder member 15 into the mouth of the bottle B and bring the engaging step surface 15*b* into engagement with the end surface of the mouth of the bottle B, whereupon the label peeling device M is readied for a label peeling operation. The bottle holder member 15 is further elevated to lift the bottle B. The scraper blade 2*a* of the label scraping unit 2 is guided by the round outer periphery of the bottom of the bottle B so as to be expanded radially outwardly because the inside diameter of the scraper balde 2*a* is smaller than the outside diameter of the bottle B (by about 1.5 mm). As a result, as shown in FIG. 7(*a*), the scraper blade 2*a* is held in intimate contact with the side of the barrel of the bottom B. Continued upward movement of the bottle holder member 15 causes the bottle side to slide in intimate contact with the scraper blade 2*a*, bringing an area where a label L is glued to the bottle side into close contact with the scraper blade 2*a*. The glue by which the label L is bonded to the bottle side has been immersed in a warm alkaline solution at a temperature ranging from about 70 to 85 C. for a period of time ranging from about 45 to 60 seconds. At this time, therefore, the label L and the glue are wet and swollen and can easily be separated from each other. Upon the upward movement of the bottle B, the label L is gradually scraped off the bottle side by the scraper blade 2*a* as illustrated in FIG. 7(*a*). The peeled label L is then caught by the label reattachment prevention member 3 in the form of a brush held in close contact with the bottle side. When the scraper blade 2*a* reaches the lowermost end of the label L, the label L is completely peeled off and removed from the bottle B as shown in FIG. 7(*b*), and the removed label L is prevented from being reattached to the bottle B by the label reattachment prevention member 3.

Then, the bottle lifting cylinder 14 is operated to retract the piston rod thereof to lower the bottle holder member 15 back to its original position shown in FIG. 1. Since the bottle B is gripped by the scraper blade 2*a* of the label scraper 2 at this time, the bottle B remains in the elevated position and does not drop. As shown in FIG. 7(*c*), the pad operating cylinder 8 is actuated to lower the presser pad 9 to force the bottle B downwardly while being held in sliding contact with the scraper blade 2*a* until the bottle B is released from the label scraper 2 into the holder 10. The pad operating cylinder 8 is actuated again to elevate the presser pad 9, and the scraping unit operating cylinders 5 are operated to lift the label scraping unit 1. All the components of the label peeling device M are now back to their original position, and the bottle B is removed from the holder 10, whereupon the label peeling operation is finished.

In the above embodiment, the label scraping unit 1 is fixed and the bottle B is moved to vary their relative position. However, the bottle B may be fixed and the label scraping unit 1 may be moved, or the bottle B and the label scraping unit 1 may be moved in opposite directions, to vary their relative position for the removal of the label L. While the label L is shown as being scraped off in a direction from the bottom of the bottle B toward the mouth of the bottle B, it may be scraped off in the opposite direction from the mouth of the bottle B to the bottom of the bottle B. Instead of immersing the glue in the alkaline solution, the label may be immersed in water or water may be sprayed over the label insofar as the glue can be wet and swollen by the applied solution.

An arrangement incorporating a label peeling device of the present invention will hereinafter be described with reference to FIGS. 8 and 9.

Figure 8:
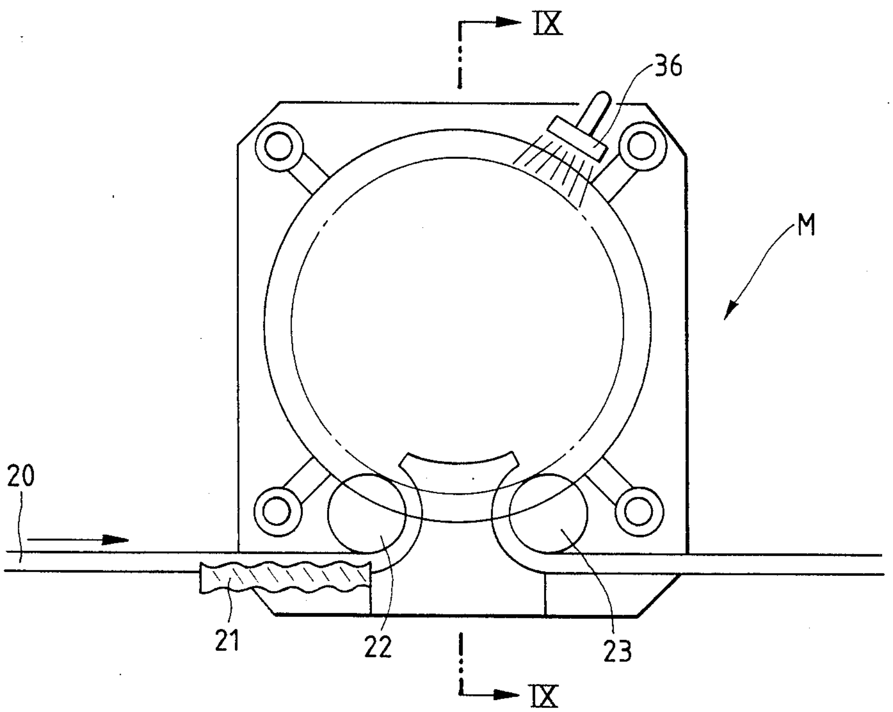
FIG. 8 is a plan view of an arrangement in which a label peeling device of the present invention is incorporated.
Figure 6:
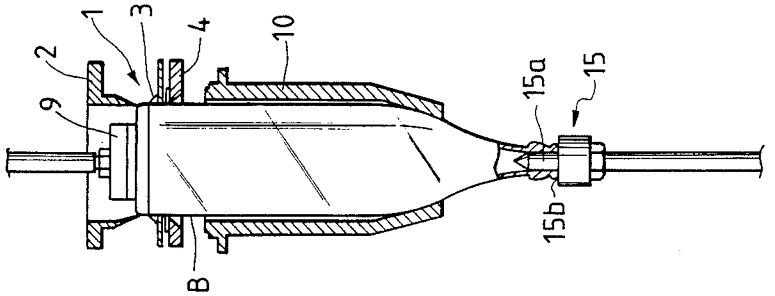
FIGS. 3 through 6 and 7(*a*) through 7(*c*) are cross sectional views showing an operation sequence of the label peeling device.
Figure 5:
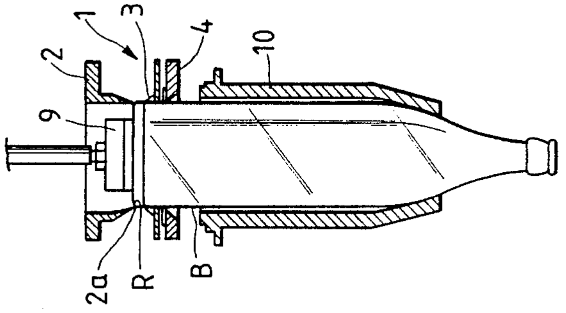
Figure 9:
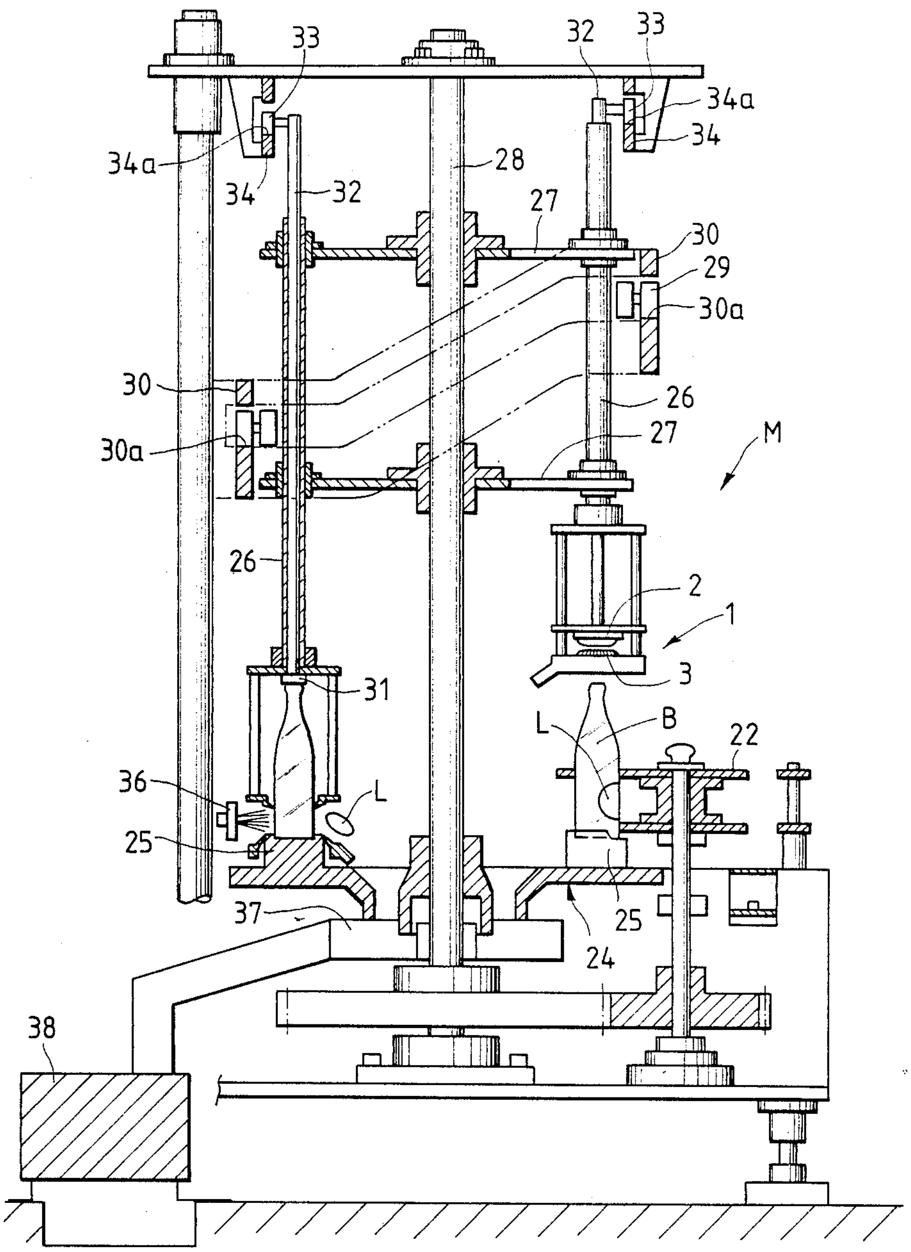
FIG. 9 is a cross-sectional view taken along line IX—IX of FIG. 8.

In the application shown in FIGS. 8 and 9, the label peeling device is disposed immediately prior to or upstream of a bottle cleaning machine with respect to the sequence of processing a bottle.

As illustrated in FIG. 8, a bottle B is supplied to a label peeling device M by a bottle conveyor 20, a worm screw 21, and a bottle supply star wheel 22. After the label has been peeled off the bottle B, the bottle B is delivered to the bottle cleaning machine by a bottle discharge star wheel 23 and the bottle conveyor 20.

As shown in FIG. 9, the label peeling device M has a rotary feeding unit 24 having a plurality of bottle supports 25 for supporting respective bottles B thereon and rotating the bottles B along a circular path, and a plurality of label scraping units disposed respectively above the bottle supports 25 in coaxial alignment therewith. Each of the label scraping units 1 is supported on a support rod 26 which is coupled to the rotary feeding unit 24 through a pair of upper and lower support plates 27 and a central support column 28 for synchronous rotation with the bottle supports 25.

Guide rollers 29 are rotatably attached respectively to the support rods 26 and rollingly engage in a guide groove 30*a* defined in a guide rail 30 which extends circularly around the central support column 28 and is progressively inclined in the direction in which the support rods 26 rotate with the bottle supports 25 around the central column 28. When the support rods 26 rotate around the central column 28, the support rods 26 with the label scraping units 1 coupled to the lower ends thereof are vertically moved for peeling the labels off bottles B on the respective bottle supports 25. A bottle holder rod 32 is slidably fitted vertically through each of the support rods 26 and has a bottle holder pad 31 on its lower end. A cam roller 33 is rotatably mounted on the upper end of each of the bottle holder rod 32 and rollingly engages in a cam groove 34*a* defined in a bottle holder cam 34, the cam groove 34*a* being progressively inclined in the direction in which the bottle holder rods 32 rotate around the central column 28. In response to the rotation of the bottle holder rods 32, therefore, the bottle holder rods 31 are vertically moved to cause the bottle holder pads 31 to hold the bottles B downwardly against the bottle supports 25. Each of the label scraping units 1 comprises a label scraper 2 having a scraper blade 2*a*, and a label reattachment prevention member 3 which are identical to those illustrated in FIGS. 1 and 2.

When a bottle B is supplied to the label peeling device M thus constructed, the bottle B is placed on one of the bottle supports 25 and rotated around the central column 28. As the bottle B is progressively rotated, the label scraping unit 1 positioned slightly upwardly of the bottle B is progressively lowered by the guide roller 29 and the guide rail 30 to enable the scraper blade 2*a* of the label scraper 2 to slide in close contact with the side of the bottle B and to scrape off a label L from the bottle B. The scraped label L is then caught by the label reattachment prevention member 3. At this time, the mouth of the bottle B is pushed down by the bottle holder pad 31 which is lowered by the cam roller 33 and the bottle holder cam 34. The peeled label L is washed away by a shower unit 36 disposed laterally of one of the label scraping units 1, and flows through a gutter 37 beneath the bottle support 25 into a label retrieval container 38.

With the arrangement shown in FIGS. 8 and 9, since a label is completely peeled off a bottle before the bottle is sent to the bottle cleaning machine, it is not necessary for the bottle cleaning machine to be equipped with a label retrieval container. Furthermore, no label remains attached to a bottle after it has been cleaned by the bottle cleaning machine.

Figure 10:
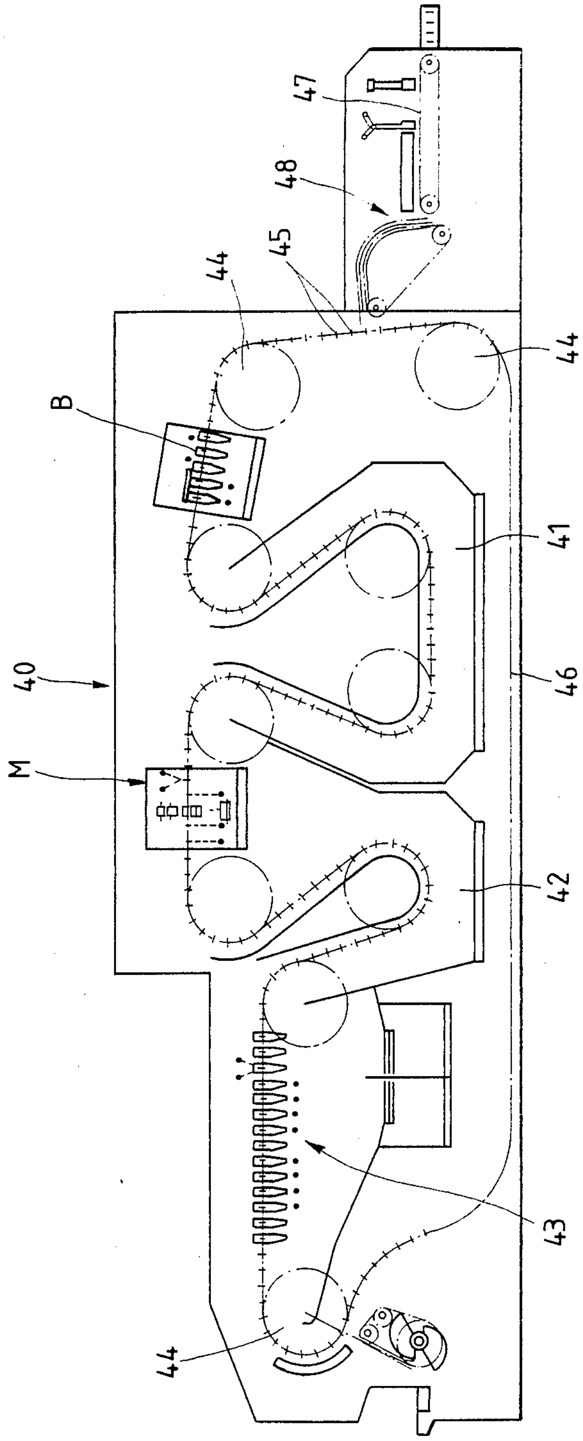
FIG. 10 is a schematic cross-sectional view of another arrangement incorporating a label peeling device of the invention.

Another arrangement incorporating a label peeling device of the invention is shown in FIG. 10. In this arrangement, the label peeling device is disposed in a bottle cleaning machine.

As shown in FIG. 10, a bottle cleaning machine 40 includes a caustic soda tank 41, a water tank 42, and a water jet unit 43 for ejecting a water jet. The bottle cleaning machine 40 also has an endless chain 46 trained around a plurality of rollers 44 along a path through the tanks 41, 42 and having a number of bottle holders 45. A label peeling device M on the present invention is disposed above the water tank 42.

A bottle B which has been delivered in an upright condition by a bottle conveyor 47 is turned down by an inserting unit 48 and inserted into one of the bottle holders 45 which are running through the bottle cleaning machine 40 by the endless chain 46. The bottle holder 45 which holds the bottle B is conveyed by the chain 46 and immersed and washed in the caustic soda tank 41, after which it is sent to the label peeling device M. The label peeling device M is basically the same in structure as the label peeling device shown in FIGS. 1 and 2, and hence will not be described in detail. A label L is peeled off the bottle B by the label peeling device M, and collected in a label retrieval container disposed below the label peeling device M. The bottle B is then immersed in the water tank 42, and then washed by a water jet ejected from the water jet unit 43.

With the present invention, as described above, a container such as a bottle is held by a holder, and after the label glued to the side of the container is wet and swollen, the relative position of a label scraping unit and the container is varied while the label scraping unit is being held in intimate contact with the side of the container, for mechanically peeling off the label from the container. Since no large-size alkaline immersion tank is required end the bottle does not need to be immersed in an alkaline solution for a long period of time, the label can be peeled in a short period of time through a simple arrangement and process.

The label can reliably be removed from the container since it is forcibly scraped off by the mechanical action of the label scraping device.

Since the label is mechanically scraped off, it is not scattered around and removed label pieces or debris can immediately be retrieved. Therefore, any contamination which would otherwise take place in an alkaline solution tank is prevented.

Although certain preferred embodiments have been shown and described, it should be understood that many changes and modifications may be made therein without departing from the scope of the appended claims.

What is claimed is:

1. A device for peeling off a label attached to a side of a container, said device comprising:

a holder for holding the container; label scraping means of a substantially cylindrical structure made entirely of an elastomeric material for scraping the label off the container by effecting sliding movement in intimate contact with the side of the container; a label reattachment preventing means disposed adjacent to said label scraping means for preventing the scraped label from being reattached to the container; and driving means for varying the relative position of the container and said label scraping means to remove the label from the side of the container.

2. A device according to claim 1, wherein said label scraping means comprises a scraper blade complementary in shape to the side of the container.

3. A device according to claim 1, further including label reattachment preventing means disposed adjacent to said label scraping means for preventing the scraped label from being reattached to the container.

4. A device according to claim 1, wherein said driving means comprises means for moving the container.

5. A device according to claim 1, wherein said driving means comprises means for moving said label scraping means.

* * * * *